A. T. HOPKINS.
BULB FOR TANK VALVES.
APPLICATION FILED APR. 13, 1914.
1,343,890. Patented June 15, 1920.
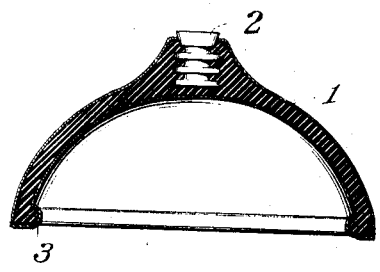
Fig. 1
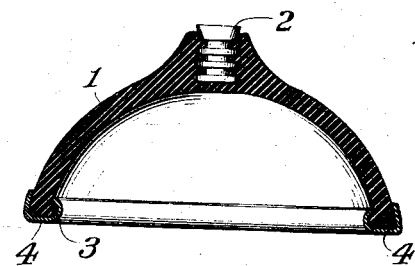
Fig. 2
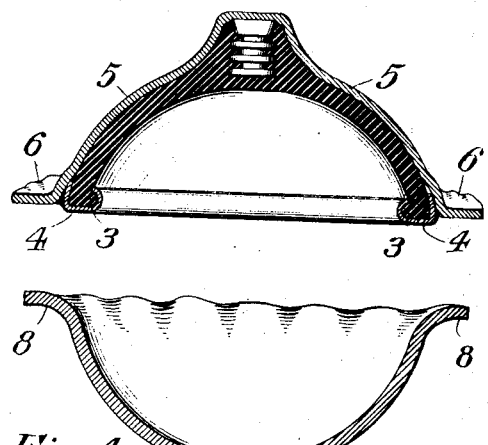
Fig. 3
Fig. 4
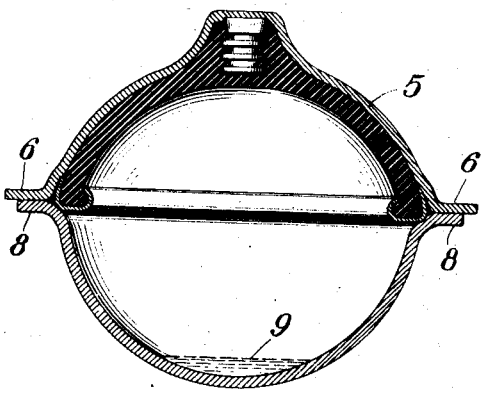
Fig. 5
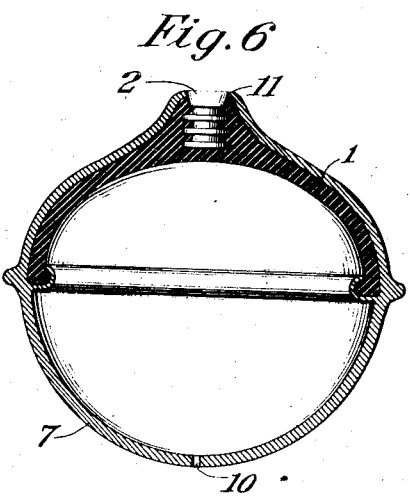
Fig. 6
Witnesses:
Edw. W. Vaill
Veronica Braun
Inventor
Arthur T. Hopkins
By his Attorney
Ernest Hopkinson

UNITED STATES PATENT OFFICE.

ARTHUR T. HOPKINS, OF CLEVELAND, OHIO, ASSIGNOR TO THE MECHANICAL RUBBER COMPANY, A CORPORATION OF NEW JERSEY.

BULB FOR TANK-VALVES.

1,343,890.     Specification of Letters Patent.     Patented June 15, 1920.

Application filed April 13, 1914. Serial No. 831,608.

*To all whom it may concern:*

Be it known that I, ARTHUR T. HOPKINS, a citizen of the United States, residing at Cleveland, county of Cuyahoga, and State of Ohio, have invented certain new and useful Improvements in Bulbs for Tank-Valves, of which the following is a full, clear, and exact disclosure.

My invention relates to that class of bulbs which are adapted to close the end of the outlet pipe of a flush tank for water-closets and similar devices, which bulb is also adapted to float on the surface of the water when removed from the outlet pipe.

The object of my invention is to produce a bulb or float which is capable of being made entirely of rubber and which at the same time will be especially effective in its operation by reason of the fact that its upper hemispherical portion will be practically rigid and inflexible, while the lower hemispherical portion will be flexible and elastic and will readily conform to the valve seat in the outlet pipe. A further object of my invention is to improve the process of manufacture of said bulbs so that the same may be made of white or light colored rubber on their exterior, the process being the subject of another application for a patent filed May 21, 1914. It has been found in the manufacture of articles of white rubber composition when the same is vulcanized or cured to such degree as to produce considerable stiffness or rigidity, the high degree of heat required is liable to injure and stain the white rubber and therefore make its appearance objectionable. On the other hand, however, black or dark rubber composition may be cured, when it has the requisite amount of sulfur or vulcanizing substance incorporated with it, to a high degree, thereby producing the requisite stiffness without injuring its strength or appearance. With this in mind, I have devised a bulb in which the upper hemispherical portion contains a core of dark or black rubber which may be vulcanized to a greater degree than the lower hemispherical portion, while at the same time the greater vulcanization will not affect the lower portion of the bulb.

For a detailed description of one form of my invention and the process of making the same, reference may be had to the following specification and to the accompanying drawing forming a part thereof in which Figures 1 to 6 inclusive are vertical sectional views of my improved bulb during different steps in the process of manufacture.

Referring to Fig. 1 of the drawing, the numeral 1 indicates the hemispherical upper portion of the bulb as it is first formed of dark or black rubber capable of a high degree of vulcanization so as to make the same stiff and rigid. This is preferably molded from a single homogeneous piece of raw rubber stock substantially cylindrical in form and sometimes called a "sausage." During the process of molding this portion 1 has inserted in its upper central point a thimble 2 into which the valve rod is adapted to be screwed. When this hemispherical portion 1 is molded it is then partially cured so as to give the same considerable rigidity and cause it to keep its shape, the curing being carried to such a point that the additional curing, given later on when the bulb is completely formed, will bring the total curing to the requisite point. The hemispherical portion 1 which may for convenience be termed a "core," having been formed and partially vulcanized as above described, is then coated on its inner and outer surfaces with a white rubber cement which will practically give a white color to both surfaces and at the same time form an adhesive. Thereafter a narrow ribbon or strip of comparatively thin raw rubber stock is placed about the outer margin of the core 1 and the bead 3, as indicated at 4 in Fig. 2, thus forming a strong adhesive surface at the points where the two halves of the bulb are to be united. Next a sheet of raw thin white rubber stock is placed over the upper outer surface of the core 1, as indicated at 5, so that it contacts with said core down to a line adjacent its lower equatorial edge, the rubber being cut to form a narrow flap extending entirely around the core, as indicated at 6. Then a piece of raw white sheet rubber stock is pressed into the form shown at 7 in Fig. 4, having outwardly extending flanged edges or flaps 8 of substantially the same internal diameter as the flap 6. This formed lower portion 7 is then placed on the upper portion 1 and flaps 6 and 8 pressed firmly into contact so that the bulb assumes the form substantially as shown in Fig. 5. There is, however, a small quantity of water or other volatile substance introduced into the interior of the bulb before the parts are placed in contact. The flaps 6 and 8 are then trimmed off close to the outer margin of the core 1 and the whole bulb placed in the vulcanizing mold and vulcanized to the requisite degree. The heat causes the volatile substance 9 within the bulb to create an internal pressure and so expand the rubber into contact with the walls of the mold during the vulcanization or curing. The bulb is then removed from the mold and any surplus rubber buffed off, as indicated for instance at 11, so that the completed bulb assumes the form shown in Fig. 6, a small hole 10 being made at the lower end of the vertical axis of the bulb to permit the egress of the expanding fluid and the admission of air.

In this completed bulb it will be observed that the same consists of a central hard core 1 in the upper portion which keeps the said portion firmly and permanently in shape, the thimble 2 being firmly embedded therein. The lower portion of the bulb consists of a very flexible and elastic wall which is firmly united to the margin of the upper portion 1, while at the same time the whole is given an attractive appearance by reason of the fact that it is completely covered with white or light colored rubber which also protects the hard rubber core from the effect of the water in which the bulb is immersed. This construction and process results in a bulb that is of much greater effectiveness than the bulbs heretofore made, has greater durability owing to the maintenance of shape and the reduced effect of the water on the rubber, and has also a more attractive appearance than the ordinary bulb made of black or dark colored rubber composition.

Having thus described this form of my invention, what I claim and desire to protect by Letters Patent is:

1. A bulb for tank valves having an upper portion comprising comparatively flexible material and a reinforcing element of less flexible material secured thereto throughout its entire upper surface, and having a socket for a valve stem in said reinforcing element.

2. A bulb for tank valves having an upper portion comprising relatively soft rubber and a reinforcing element of relatively hard rubber secured thereto throughout its entire upper surface, and a thimble for a valve stem embedded in said reinforcing element.

Signed at Cleveland, county of Cuyahoga, State of Ohio, this 4th day of April, 1914.

ARTHUR T. HOPKINS.

Witnesses:
ELIZABETH M. CONDON,
RALPH H. TYRRELL.